United States Patent [19]

Lance

[11] 4,297,756

[45] Nov. 3, 1981

[54] LOCKING WRENCH TOOL WITH AUXILIARY MECHANICAL OUTPUT

[76] Inventor: Bruce J. Lance, 1460 Chase Dr., Corona, Calif. 91720

[21] Appl. No.: 128,307

[22] Filed: Mar. 7, 1980

Related U.S. Application Data

[63] Continuation-in-part of Ser. No. 83,000, Oct. 9, 1979, abandoned.

[51] Int. Cl.³ .............................. B25B 7/22; B25B 7/12
[52] U.S. Cl. ........................................... 7/127; 81/367; 81/5.1 R
[58] Field of Search ............................ 7/125, 127, 129; 81/367–380, 5.1 R

[56] References Cited

U.S. PATENT DOCUMENTS

| | | | |
|---|---|---|---|
| 2,280,005 | 4/1942 | Petersen | 81/380 |
| 2,514,130 | 7/1950 | Jones | 81/380 |
| 3,600,986 | 8/1971 | Baldwin, Jr. | 81/379 |
| 4,157,594 | 6/1979 | Raabe | 7/125 |

FOREIGN PATENT DOCUMENTS 151649  9/1966  U.S.S.R. ............................. 7/127

Primary Examiner—Roscoe V. Parker
Attorney, Agent, or Firm—Thomas A. Fournie

[57] ABSTRACT

Provided are two general types of locking wrench tools having coacting jaws, fixed and movable handle structure and resiliently biased toggle mechanism operative to maintain the coacting jaws of the tools locked clamped. Each of the tools is arranged to have an auxiliary mechanical output device. Several types and embodiments of auxiliary mechanical output devices are provided including rod clamping and holding mechanism; ball and socket mechanism suitable for adjustable positioning to hold, for example, a camera, in a fixed position; and punch mechanism.

7 Claims, 23 Drawing Figures

LOCKING WRENCH TOOL WITH AUXILIARY MECHANICAL OUTPUT

CROSS-REFERENCE TO RELATED APPLICATION

This is a continuation-in-part of application Ser. No. 083,000, filed Oct. 9, 1979, and now abandoned.

BACKGROUND OF THE INVENTION

The present invention relates to tools and more particularly to locking wrench tools of the type having pliers-type handles with resiliently biased toggle mechanism operable to maintain the tool tightly clamped on an object or workpiece to be gripped. Prior art locking wrench tools of such type are disclosed and described in U.S. Pat. No. 2,280,005 issued to Peterson; U.S. Pat. No. 2,514,130 issued to Jones; and U.S. Pat. No. 3,600,986 issued to Baldwin.

SUMMARY OF THE INVENTION

It is an object of the present invention to provide an improved locking wrench tool of the general type shown in the aforementioned U.S. patents.

It is further an object of the present invention to provide an improved tool as set forth characterized by having an auxiliary mechanical output device associated therewith which is actuated by the movement and positioning of the tool's toggle mechanism occurring in connection with its clamping action.

In accomplishing these and other objects there are provided two general types of locking wrench tools having coacting jaws, fixed and movable handle structure and resiliently biased toggle mechanism operative to maintain the coacting jaws of the tools locked clamped. Each of the tools is arranged to have an auxiliary mechanical output device. Several types and embodiments of auxiliary mechanical output devices are disclosed including rod clamping and holding mechanism; ball and socket mechanism suitable for adjustable positioning to hold, for example, a camera, in a fixed position; and punch mechanism.

Additional objects of the present invention reside in the specific embodiments of the locking wrench tools and their auxiliary mechanical output devices shown in the several drawing figures and hereinafter described in conjunction therewith.

DETAILED DESCRIPTION OF THE PREFERRED EMBODIMENTS

Figure 1:
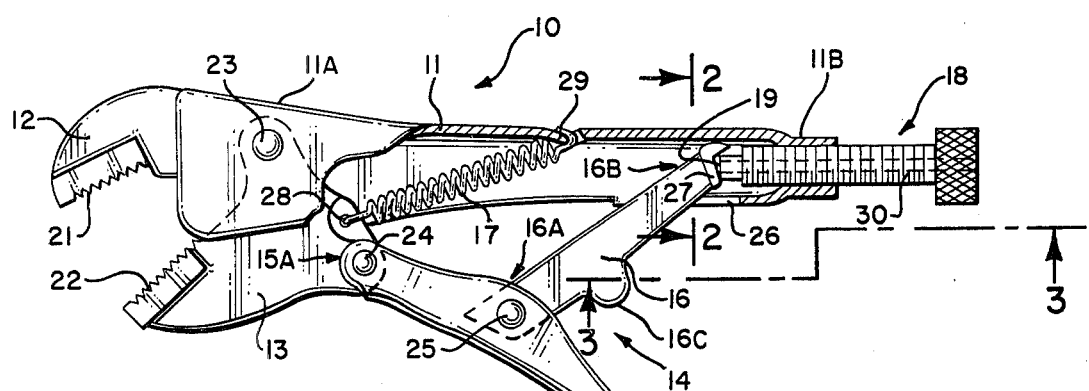
FIG. 1 is a partially cutaway side view of one general type of locking wrench tool having associated therewith an auxiliary mechanical output device according to the present invention in the form of a rod clamping and holding device, the jaws of the tool being opened ready for clamping on a support.
Figure 2:
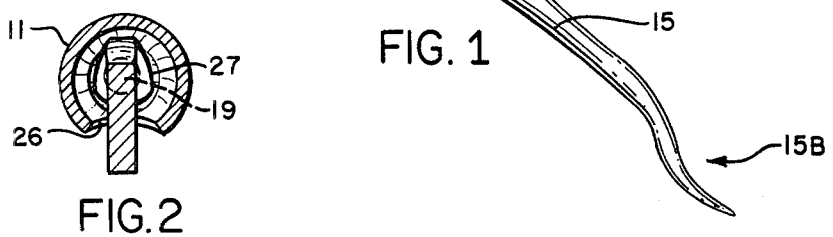
FIG. 2 is a view taken along the line 2—2 of FIG. 1.
Figure 3:
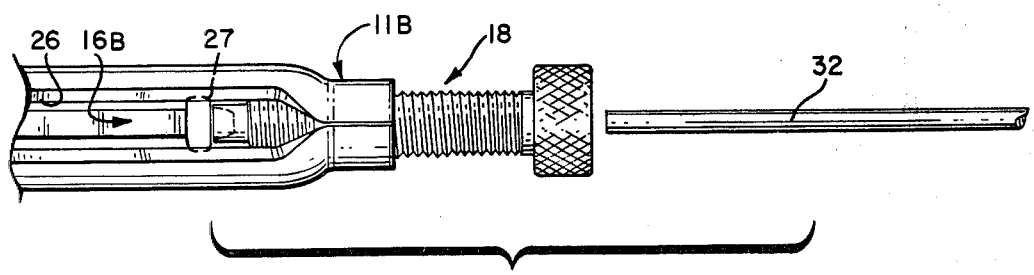
FIG. 3 is a view taken along the line 3—3 of FIG. 1, illustrating a rod-like member positioned for insertion into the rod clamping and holding device associated with the tool of FIG. 1.

Referring to the drawings in more detail, there is shown in FIGS. 1-5 a locking wrench tool which is identified generally by the numeral 10.

The tool 10 is made up of a fixed handle member 11; a fixed jaw member 12; a movable jaw member 13; a toggle mechanism 14 formed by a movable handle 15 and toggle link 16; a resilient member 17 for resiliently biasing the toggle mechanism 14; and adjustable bolt structure 18 defining a bearing surface 19 for the toggle link 16.

The fixed handle member 11 has top and bottom ends 11A and 11B, respectively, and is formed of a substantially straight U-shaped channel member. The U-shaped channel member forming the fixed handle member 11 is bent closed on the bottom end 11B to define a longitudinally extending threaded channel for receiving and into which may be threaded the threaded bolt 18. The remainder of the U-shaped channel forming the fixed handle member 11 opens inwardly to greater or lesser extent and the fixed jaw member 12 is stationarily mounted within the top handle end 11A to coact with the movable jaw member 13. Each of the jaw members 12 and 13 have inner and outer longitudinal edges and carry on their inner longitudinal edges facing and opposed object gripping surfaces 21, 22 respectively.

The movable jaw member 13 is pivotally mounted within the top end 11A of the fixed handle member 11 to longitudinally extend therefrom in a coacting opposed position with respect to the stationary jaw member 12. The jaw member 13 is so pivotally mounted by means of a pivot pin defined by rivet 23 through the inner corner of the inner longitudinal side of the jaw member 13. The pivot pin 23 thereby defines a pivot point in this inside corner of the jaw member 13 about which the movable jaw member 13 pivots.

The movable handle member 15 is also illustrated formed of a substantially straight piece of U-shaped channel member and has top and bottom ends 15A and 15B, respectively. The lower outside corner of the jaw member 13 is pivotally mounted within the top end 15A of the handle member 15 by means of a pin 24, and the U-shaped channel defined by the handle member 15 is positioned facing inwardly. The pivot pin 24 defines a pivot point on the jaw member 13 outwardly positioned with respect to the pivot point defined thereon by the pin 23.

The toggle link 16 has two ends 16A, 16B and an outwardly extending stop 16C formed at a selected point between its ends. The link end 16A fits within the U-shaped channel defined by the handle 15 and is pivotally connected thereto at a point 25 located a selected distance between the handle ends 15A, 15B. The end 16B of the toggle link 16 fits within an upwardly opening longitudinal guide slot 26 defined in the bottom end portion of the fixed handle 11 and bears upon the upwardly facing bearing surface 19 defined by the bolt structure 18. A stop 27 is formed on the lower end of the link 16B to prevent same from slipping out of the handle end 11B through the longitudinal guide slot 26.

The resilient member 17 is a coil spring and is connected to extend between the movable jaw member 13 and the fixed handle member 11. The spring 17 is illustrated connected on one end by being hooked in a hole located at point 28 on the jaw member 13, the hole and point 28 being located on the jaw member 13 between the pivot points 23 and 24. The other end of the spring 17 is hooked on a projection 29 formed on the inside of the fixed handle member 11. The projection 29 is illustrated formed above the bearing surface 19 at a point approximately halfway between the handle ends 11A and 11B. The pulling force of the spring 17 operates to hold the toggle link end 16B biased against the bearing surface 19 and the tool 10 clamped on an object.

The tool 10, to the extent hereinabove described, corresponds to and operates like the wrench described in U.S. Pat. No. 2,280,005 to Peterson. Accordingly, the text, description and disclosure of this patent is hereby incorporated herein by reference.

The tool 10, however, has the additional feature and utility, not disclosed or suggested by the aforementioned Peterson patent, of being constructed to hold a rod-like member clamped in a stationary position. This feature of a rod clamping and holding device is provided by the straight bore 30 formed in the bolt structure 18 which extends longitudinally from the bottom knurled end of the bolt 18 to the bearing surface 19. Formed in the toggle link end 16B is another similarly sized straight bore 31 which is positioned to be in substantial alignment with the bore 30 when the tool handle 15 is open, as shown in FIG. 1. A rod member 32 may be stationarily clamped in place by use of the tool 10, as shown by FIG. 1–5, by inserting the rod 32 in the bores 30, 31 with the tool 10 open and then clamping the tool jaws 12, 13, on an object, such as support 33. Closure of the handle 15 to a position against stop 16C causes the toggle mechanism 14 to lock the tool jaws 12, 13 on the support 33 and at the same time shifts the bore 31 in the link end 16B out of alignment with the bore 30 to clamp the inserted rod 32 in a stationary position in the bore 30.

Figure 4:
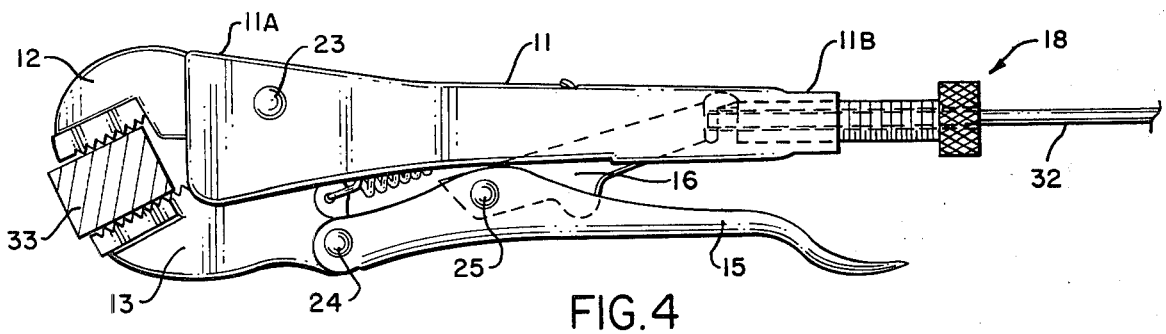
FIG. 4 is a side view of the tool of FIG. 1 illustrated clamped on a support and with the rod clamping and holding device of FIG. 1 holding clamped in a stationary position the rod-like member illustrated in FIG. 3.
Figure 5:
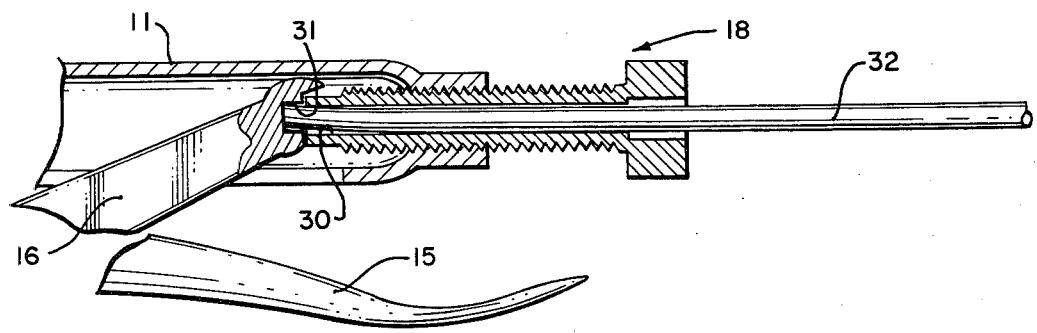
FIG. 5 is a cutaway partial side view of the fixed handle portion of the tool shown in FIG. 4.

In FIG. 4, the tool 10 is illustrated being used to clamp the rigid rod 32 in a stationary position on the support 33. The rod 32 could have a lamp assembly clamped thereto by a clamp in the manner shown in hereinafter discussed FIG. 6, or needless to say, the improved tool 10 with its rod clamping capability has many other similar uses. For example, two of such tools 10 could be clamped on opposite ends of a rod for clamping a workpiece to be welded on a bar grill. Similarly, a reg flag carried on a rod-like member 32 could be clamped by such a tool 19 on a long object extending from the rear of a vehicle. Likewise, the tool 10 could be used to secure in place a sign mounted on a rod 32.

It is noted that the selective misalignment of the bores 30, 31 occurring when the tool 10 is clamped on an object may kink the rod 32 inserted therein. Such a kink may be taken out of the rod 32 by unclamping the tool 10, rotating the rod 32 180° in the bores 30, 31 and then reclamping for an instant the tool 10 on an object. It is also noted regarding the tool 10 that the threaded mounting of the bolt structure 18 permits longitudinal adjustment of the bearing surface 19 relative to the handle end 11B. Thereby, the spacing of the jaws 12, 13 when closed may be controlled by selectively adjusting the longitudinal position of the bearing surface 19.

Figure 6:
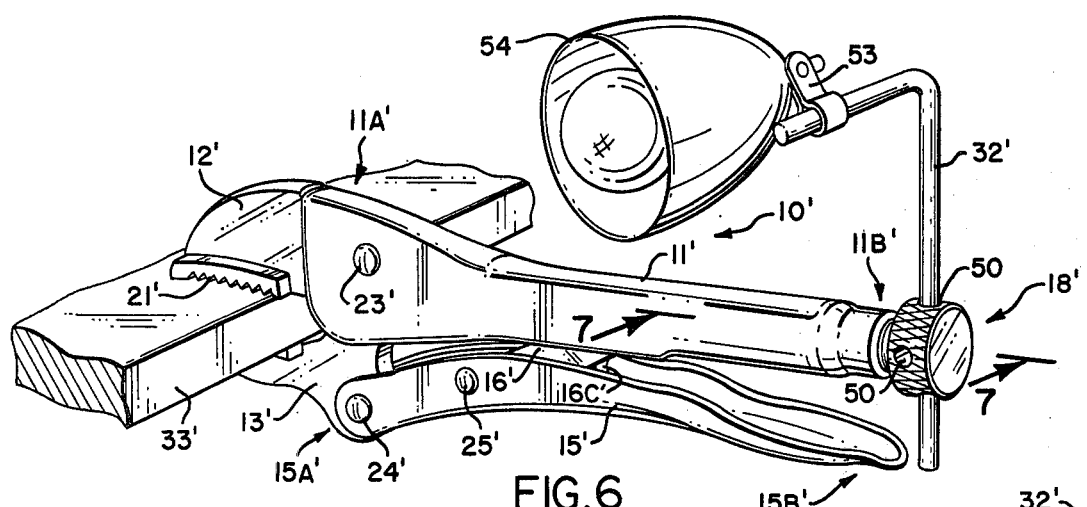
FIG. 6 is a perspective view illustrating the general type of locking wrench tool of FIG. 1 having associated therewith another embodiment of auxiliary mechanical output device according to the present invention in the form of a modified rod clamping and holding device.
Figure 8:
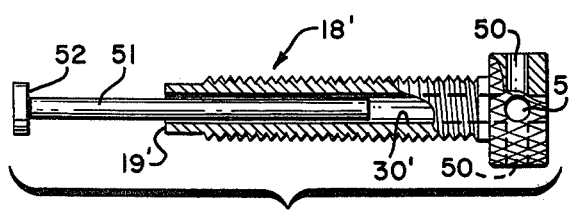
FIG. 8 is a partially cutaway side view of the rod clamping and holding device of FIG. 6.
Figure 7:
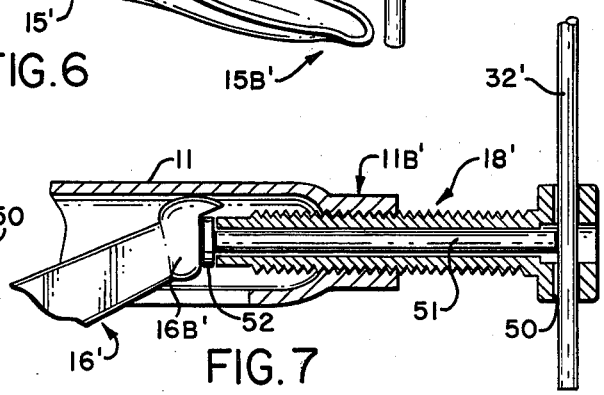
FIG. 7 is a view taken along the line 7—7 of FIG. 6.

Referring to FIGS. 6–8, the aforedescribed locking wrench tool is there shown modified to form another embodiment of rod clamping and holding device capable of holding a rod-like member clamped in a stationary position. For clarity, the locking wrench tool is generally identified by the numeral 10' in FIGS. 6–8, instead of 10. The tool 10' with the hereinafter noted exceptions is constructed and operates in the same manner as the aforedescribed tool 10, and accordingly corresponding parts are marked by the same numerals with a prime added.

In the tool 10', the knurled bottom end of the adjustable bolt 18' has two straight cross-bores 50 formed to extend transversely therethrough. The cross-bores 50 are illustrated extending substantially perpendicularly to each other and are each normal to the longitudinal bore 30' and intersect same. A pin 51 having an enlarged head 52 formed thereon is inserted in the portion of the bore 30' extending between the bearing surface 19' and the cross-bores 50. The pin head 52 is larger than the diameter of the bore 30' and the length of the pin 51 is slightly longer than the length of the bore 30' between the bearing surface 19' and the cross-bores 50. Clamping of the tool jaw members 12', 13' on an object, such as the support 33' shown in FIG. 6, causes the toggle link end 16B' to force the pin 51 against the rod 32' as shown in FIG. 7 to tightly clamp same in place in the crossbore 50. In FIG. 6, the rod-like member 32' is illustrated having a right angle bend formed therein with a clamp 53 carrying a lamp 54 clamped on one end thereof.

Figure 9:
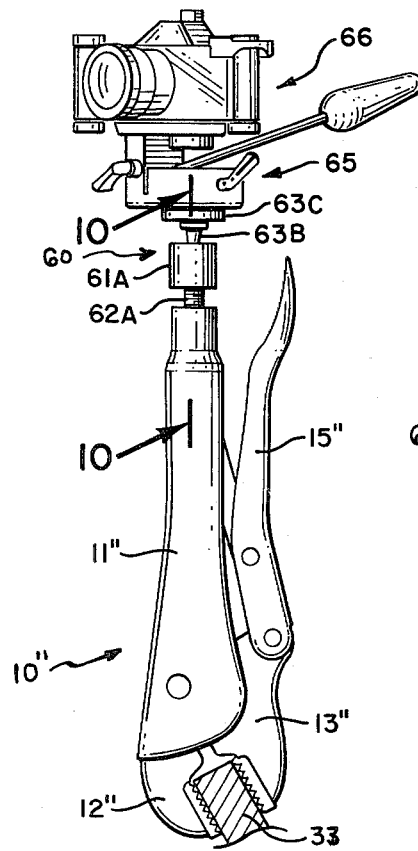
FIG. 9 is a perspective view illustrating the general type of locking wrench tool of FIG. 1 having associated therewith yet another embodiment of auxiliary mechanical output device according to the present invention in the form of a ball and socket camera holding device.
Figure 10:
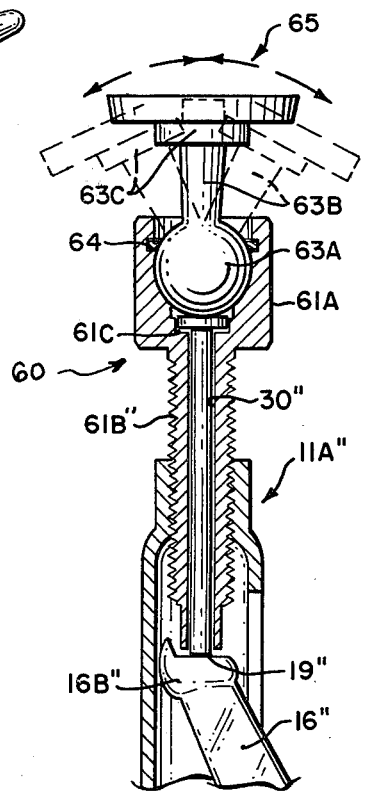
FIG. 10 is a view taken along the line 10—10 of FIG. 9.
Figure 11:
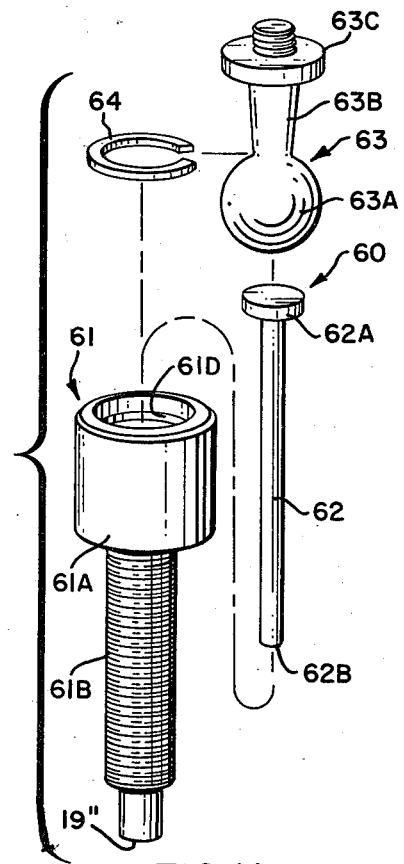
FIG. 11 is an exploded view of the ball and socket camera holding device of FIG. 9.
Figure 12:
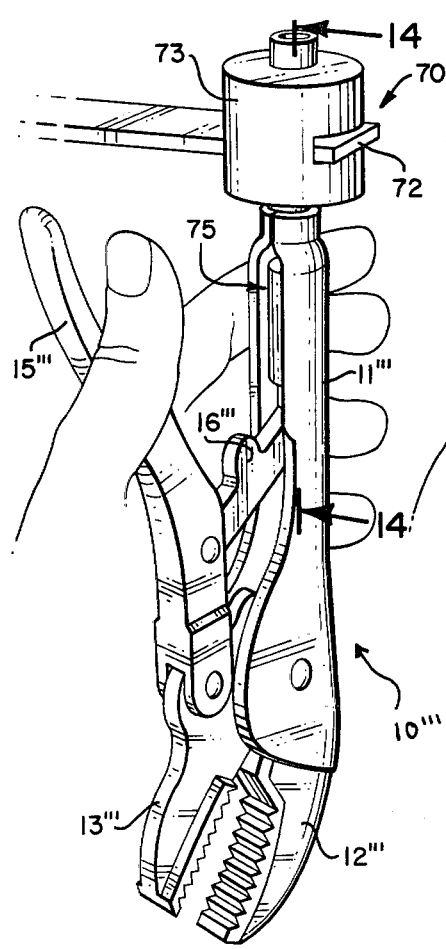
FIG. 12 is a perspective view illustrating the general type of locking wrench tool of FIG. 1 having associated therewith still another embodiment of auxiliary mechanical output device according to the present invention in the form of a punch.
Figure 13:
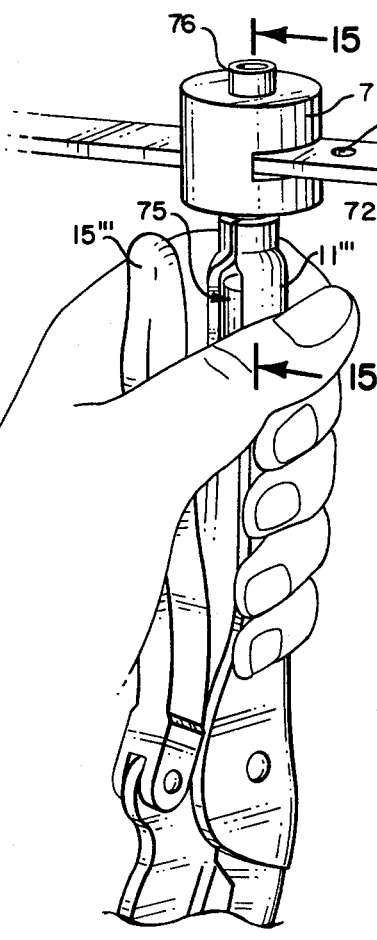
FIG. 13 is a perspective view as in FIG. 12 illustrating a metal band being punched.
Figure 14:
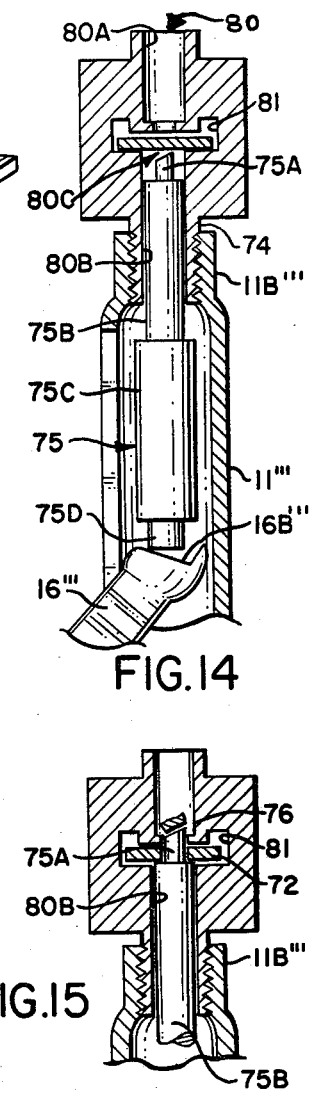
FIG. 14 is a view taken along line 14—14 of FIG. 12.

Referring to FIGS. 9–11, the above-described locking wrench tool is there shown having associated therewith an auxiliary mechanical output device in the form of camera holding mechanism 60. For clarity and purposes of reference, the tool is generally identified by the numeral 10" in FIGS. 9–11, instead of 10. The tool 10" with the hereinafter noted exceptions is constructed and operates in the same manner as the aforedescribed tool 10, and accordingly corresponding parts are marked by the same numerals with a double prime added.

The components of the camera holding mechanism 60 are shown exploded apart in FIG. 11, and include socket structure 61, a pin 62, a ball member 63 and a retaining washer 64.

The socket structure 61 is formed of a ball receiving socket 61A mounted on a threaded bolt shaft 61B. The threaded bolt shaft 61B illustrated is formed like the shaft of the hereinbefore described bolt 18, having a longitudinal bore 30" and defining bearing surface 19" on its end away from the socket 61A. The pin 62 is dimensioned for insertion in the bore 30" and has an enlarged head 62A formed on one end.

The pin head 62A is sized to have a diameter larger than the bore 30" and to fit within a circular recess 61C formed in the bottom of the socket 61A. The recess 61C extends normal to the axis of the bore 30". The pin 62 is dimensioned to have a length slightly longer than the bore 30" so that its lower end 62B extends slightly beyond the bearing surface 19" when the pin head is resting in the recess 61C.

The ball portion 63A of the ball member 63 is dimensioned to rotatably fit within the socket 61A and is held therein by fitting the retaining washer 64 in the circular washer groove 61D formed around the inside of the socket 61A. A mounting shaft or extension member 63B is formed to extend from the ball portion 63A and has a threaded seat 63C formed on its outer end adapted to have a camera mounting device screwed thereon. A conventional camera mounting device 65 carrying a camera 66 is shown screwed on the seat 63C in FIG. 9.

The tool 10" may be used to selectively mount the camera 66 in a selected position in the following manner. The position of the camera 66 is selected by adjusting the conventional camera mounting device 65 and the position of the ball 63A in the socket 61A, as shown in phantom in FIG. 10. The tool 10" then is clamped on the support 33" as shown in FIG. 9. Clamping of the tool 10" on the support 33" causes the end 16B" of the toggle link 16" to force the pin head 62A against the ball 63A, thereby to lock and clamp the position of the ball 63A in the socket 61A. In the operation of this mechanism 60, the pin head 62A functions as a pressure applying surface for applying a pressure clamping force to the surface of the ball 63A.

It is noted that the ball and socket mechanical output device shown and described in FIGS. 9–11, while shown specifically arranged for supporting a camera, could readily be adapted for many other uses, such as, to support lamps, flashlights, telescopes, etc.

FIGS. 12–15 illustrate an auxiliary mechanical output device in the form of punch 70 associated with the hereinabove described locking wrench tool. For purposes of clarity and reference, the tool is generally identified by the numeral 10'" in FIGS. 12–15, rather than 10. The tool 10'" with the hereinafter noted exceptions is constructed and operates in the same manner as the earlier described to 10. Accordingly, corresponding parts are marked by the same numerals with a triple prime added.

The punch 70 illustrated is arranged for punching circular holes 71 in a metal band 72, and is made up of a cylindrical housing 73 having a threaded shaft 74 formed to extend therefrom, a punch member 75 and a die member 76.

The threaded shaft 74 extends from the punch housing 73 along its longitudinal axis and is dimensioned to thread into the fixed handle end 11B'" of the tool 10'". A longitudinal bore 80 is formed through the structure defined by the housing 73 and shaft 74. The upper portion of this bore 80, designated 80A, is designed for receiving the die 76, and the lower portion of this bore, designated 80B, is designed to receive the punch member 75. A transversely extending flat slot 81 is formed through the housing 73 which extends through the central portion of the bore 80, designated 80C, between the die 76 and punch member 75.

The die 76 and bore portion 80A are arranged to threadably mate. The punch member 75 is formed of the following longitudinally aligned portions: a conventionally formed cylindrical metal punching end 75A; a cylindrical bearing portion 75B; an enlarged cylindrical stop portion 75C; and a cylindrical rod portion 75D. The punch portion 75D functions to receive the mechanical output force from the toggle mechanism of the tool 10'". The stop 75C operates to retain the punch member 75 in the handle end 11B'". The bearing surface 75B functions to slidably mount the punch member 75 in the bore 80B and the punching end 75A is shaped to have an edge to cut through the metal band 72 to be punched.

The tool 10'" and punch mechanism 70 operates as follows in punching a hole 71 in the band 72. The punch housing 73 is mounted on the handle end 11B'" by threading the shaft 74 therein. With the shaft 74 so threaded into the handle 11B, the punch member end 75D bears against toggle link end 16B'". The metal band 72 is inserted in the slot 81 and the tool handles 15'" and 11'" are closed to actuate the punch member 75 through the action of the tools's toggle mechanism 14'" to punch a hole 71 in the band 72. It is noted that depending on the length and positioning of the punch member 75 in the handle 11'", it may or may not be necessary to clamp the tool on an appropriately sized object when performing such punching operation. It generally will not be necessary to so clamp the tool jaws 12'" and 13'" on an object if the jaws close against each other during the punching operation.

Figure 15:
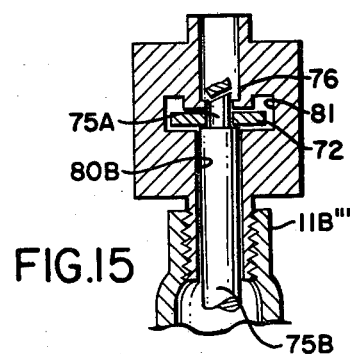
FIG. 15 is a view taken along line 15—15 of FIG. 13.

Once a hole 71 is punched in the metal band 72, as shown in FIG. 15, the punch cutting end 75A may be conveniently disengaged from the band 72 by rotatably disengaging the punch shaft 74 from the handle end 11B'".

Figure 16:
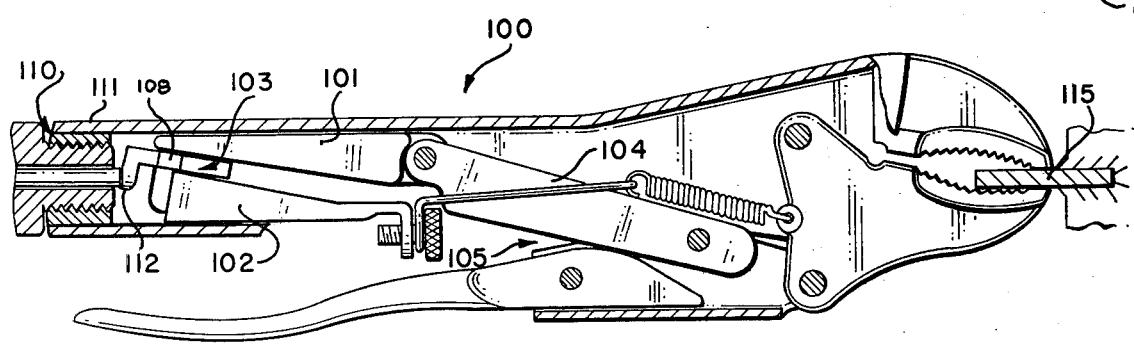
FIG. 16 is a partially cutaway side view of another general type of locking wrench tool illustrated in its clamped position and having associated therewith the ball and socket camera holding device of FIGS. 9-11.
Figure 17:
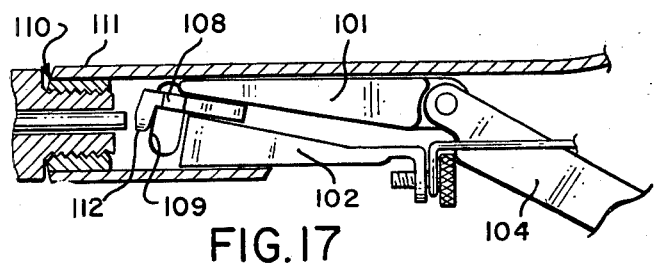
FIG. 17 is a cutaway partial side view of the tool shown in FIG. 16 illustrating the positioning of the tool's sliding wedges and separation plate when in its unclamped position.

Referring to FIGS. 16–17, an alternate embodiment of locking wrench tool generally identified by the numeral 100 is there shown. The locking wrench tool 100 is of the general type shown and described in U.S. Pat. No. 3,600,986 to Baldwin, and the text, description and disclosure of this patent is hereby incorporated herein by reference.

The locking wrench 100, which is self-adjusting, utilizes the sliding wedge mechanism provided by wedges 101, 102 and the separation plate 103 to provide a bearing surface for supporting the toggle link 104 of its resiliently biased toggle mechanism 105. With the jaws 106 and 107 of the tool 100 opened, the separation plate 103 is pulled forward by the toggle mechanism action as shown in FIG. 17 so that the lugs 108 thereon are pulled against the forward edges of the apertures 109. Closure of the tool 100 to its clamping position causes the separation plate 103 to be shifted in the aperture 109 both longitudinally and vertically by the action of the toggle mechanism 105 so that the lugs 108 are shifted against the rear edges of the apertures 109, as shown in FIG. 16.

The improved tool 100 shown in FIGS. 16 and 17 is arranged to include the ball and socket camera holding device described in FIGS. 9-11, having thread structure 110 formed in its fixed handle end 111 to receive and threadably hold same. Further, a projection or lip 112 is formed on the rear of the separation plate 103 of the tool 100 positioned to contact the end 62B of the force transmitting pin 62 in the ball and socket clamping device 60.

In operation of the tool 100, clamping of same on a support 15, as shown in FIG. 16, causes the toggle mechanism 105 to force the separation plate 103 slightly rearwardly and the rearward movement of the separation plate 103 causes the separation plate lip 112 to transmit a clamping force to the pin 62, which in turn causes a clamping pressure to be applied by the pin head 62A to the ball 63A. Thereby, the ball 63 is clamped in a fixed position to hold a camera or other device carried by its shaft 63B in a stationary position relative to the support 115.

It is apparent from a review of the operation of the tool 100 as modified in accordance with the present invention to include the ball and socket mechanical output device that same could be utilized to operate other of the hereinbefore described auxiliary mechanical output devices. The mechanical output device selected could simply be threaded into the thread structure 110 in the end of the tool's handle 111 in place of the ball-socket holding device 60.

Referring now to FIGS. 18-23, the alternate embodiment of locking wrench tool shown in and described in connection with FIGS. 16-17 is there illustrated in a modified form. For reference purposes, this locking wrench tool is generally identified by the numeral 100' in FIGS. 18-22 instead of 100. The tool 100' with the hereinafter noted exceptions is constructed and operates in the same manner as the aforedescribed tool 100, and accordingly corresponding parts are marked by the same numerals with a prime added.

In tool 100', a ball and socket output device 120 is illustrated formed in the hereinafter described manner. The ball and socket output device has a threaded shaft or extension member 121 with an associated transversely extending circular mounting plate 119 on to which a camera, such as the camera 66 shown in FIG. 9, can be mounted and held by being screwed thereon.

The tool's fixed handle member end 111' has an up and down extending rounded groove 122 formed in its side walls 123 which is dimensioned and shaped to correspond to the curvature of the ball 124 carrying the threaded shaft 121. In order to insert the ball 124 into the groove 122, an entrance channel 125 is formed in the lower portion of the walls 123. The ball 124, once inserted in the groove 122 via the channel 125, is moved upwardly in the grooves 122 to abut against the top edge surface 126 of the handle end 111 and the top edge surface 126 has its interior 127 rounded so as to define in connection with the grooves 122 in the walls 123 a socket for rotatably holding the ball 124. Rivet pins 128 are mounted to extend transversely interiorly from the side walls 123 below the ball 124, thereby to hold same in place in the aforedescribed socket structure.

Figure 20:
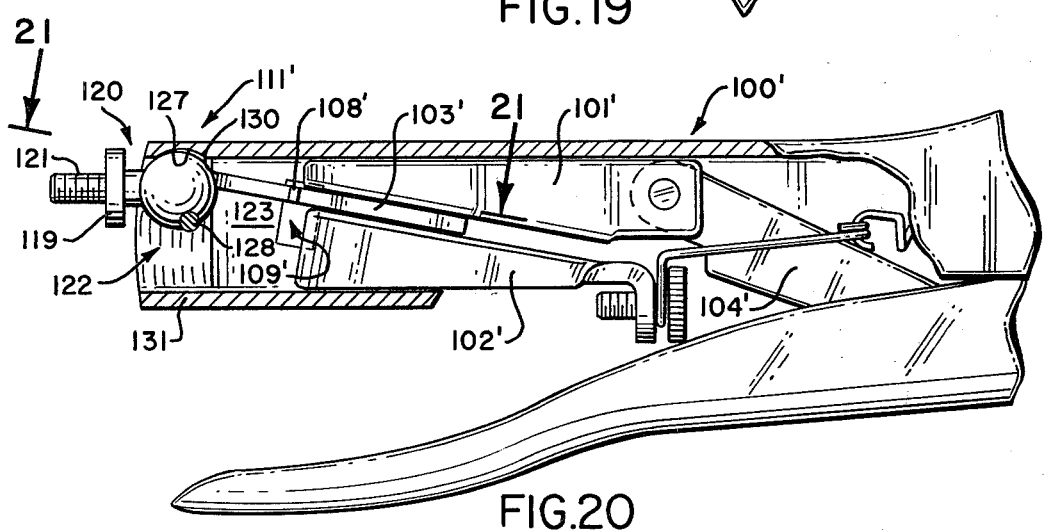
Figure 21:
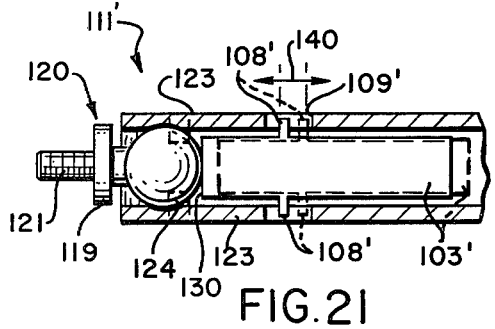
FIG. 21 is a view taken along the line 21—21 of FIG. 20.

In operation of the tool 100', closure of same to a clamped position forces the separation plate 103' slightly rearwardly so that its straight end 130 is forced against the ball 124. Thereby, the ball 124 is locked and clamped in a fixed position as shown in FIGS. 20 and 21. It is noted that this forward-rearward movement of the separation plate 103' caused by the closure and opening of the tool 100' can be accurately controlled by appropriately sizing and dimensioning the plate 103', the width of the lugs 108' thereon, and the lug receiving rectangular apertures 109'.

Opening of the tool 100' causes forward movement of the separation plate 103', thereby releasing the ball 124. With the ball 124 released, it may be rotated in the socket defined by the grooves 122 and 127 to selectively position the threaded mounting shaft 121. It is noted that this alternate forward-rearward movement of the separation plate 103' is indicated in FIG. 21 by the directional arrow 140 place adjacent one of the lugs 108'.

Figure 18:
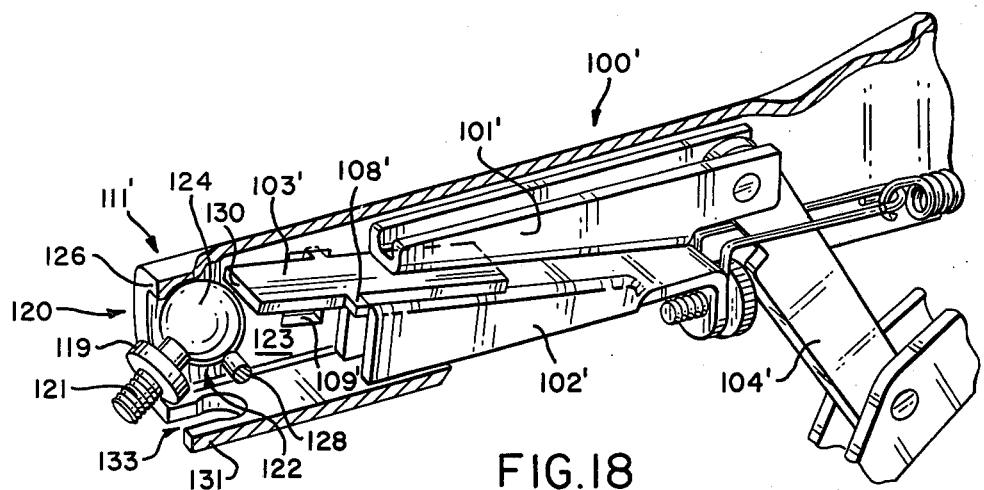
FIG. 18 is a perspective cutaway view illustrating the general type of locking wrench tool of FIG. 16 having associated therewith an alternate embodiment of ball and socket camera holding device.
Figure 19:
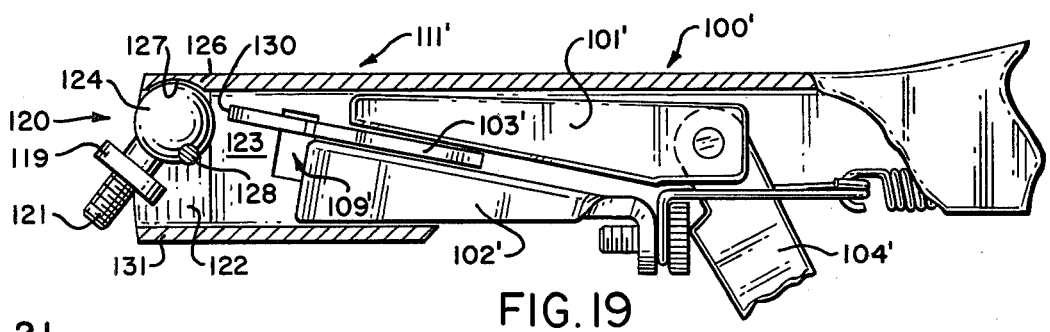
FIGS. 19 and 20 are cutaway side views of the locking wrench tool of FIG. 18 in its unclamped and clamped positions, respectively.
Figures 22, 23:
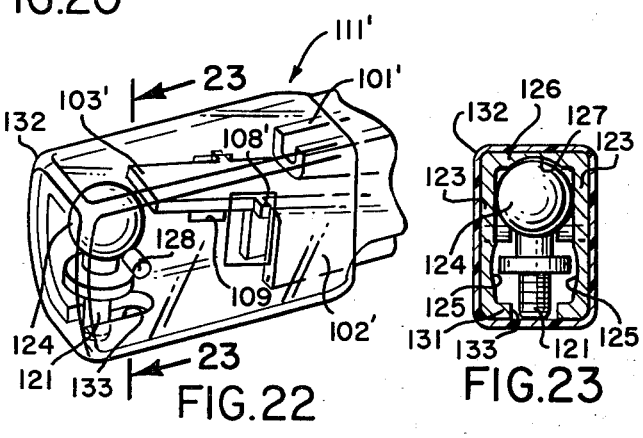
FIG. 22 is a perspective view of the end of the fixed handle member of the locking wrench tool of FIG. 18 illustrating the ball and socket camera holding mechanism thereof rotated into a stowed position and being so held by a transparent handle grip fitted over the fixed handle member end.
FIG. 23 is a view taken along the line 23—23 of FIG. 22.

As shown in the drawings and in particular by FIGS. 18, 22 and 23, a longitudinal guide notch or opening 133 is formed in the bottom edge surface 131 of the tool handle end 111 to receive the outer end of the threaded shaft 21 so that the ball-socket mechanism 120 may be rotated to an out of the way stow position as shown in FIG. 22. It is noted that the length of the shaft 121 is appropriately dimensioned so that its outer end when stowed is substantially flush with and does not extend from the outer edge of the handle bottom edge surface 131. Thereby, a cover member 132, illustrated in the form of a transparent handle grip 132, may be slipped on the handle end 111 to hold the ball-socket mechanism 120 stowed out of the way when not in use in the hollow storage cavity defined by the fixed handle end 111.

With the ball-socket mechanism 120 so stowed, the tool 100' may be used in its conventional manner as described in U.S. Pat. No. 3,600,986 to Baldwin.

Although I have herein shown and described my invention in what I have conceived to be the most practical and preferred embodiments, it is recognized that departures may be made therefrom within the scope of the appended claims.

I claim:

1. In a locking wrench tool having coacting jaws, fixed and movable handle structure and resiliently biased toggle mechanism operative to maintain the coacting jaws of said tool locked clamped, the improvement in combination therewith of auxiliary means for generating a mechanical output, said auxiliary mechanical output generating means being actuated to generate a mechanical output by the movement and positioning of said toggle mechanism occurring in connection with the clamping action of said tool and comprising:

ball means for supporting an object to be held, said ball means including a substantially round ball with an extension member formed to extend therefrom, said extension member being adapted to engage and support an object to be held;

socket means for receiving and rotatably holding said ball therein; and means actuated by the movement and positioning of said toggle mechanism occurring in connection with the clamping action of said tool for clamping said ball against rotation in a fixed position in said socket means.

2. The locking wrench tool defined in claim 1, wherein said means for clamping said ball against rotation in a fixed position in said socket means is force applying means operable to exert a locking and clamping pressure against said ball in said socket means to lock same in place.

3. The locking wrench tool defined in claim 2, wherein said force applying means includes a force applying pin for applying pressure to said ball.

4. The locking wrench tool defined in claim 2, wherein said force applying means includes:
a pin having first and second ends, said first end being actuated by the movement of said toggle mechanism and said second end being for applying said locking and clamping force to said ball; and
structure means slidably mounting said pin in a substantially linear path of movement between said toggle mechanism and said ball with said first pin end positioned adjacent said toggle mechanism and said second pin end adjacent said ball.

5. The locking wrench tool defined in claim 2, wherein:
said tool is self-adjusting and of the type having a pair of sliding wedges with a separation plate therebetween associated with its toggle mechanism;
said socket means is defined by the end of the fixed handle structure of said tool; and
said force applying means for applying pressure to said ball is said separation plate.

6. The locking wrench tool defined in claim 5, wherein the end of the fixed handle structure of said tool defines a hollow storage cavity into which said auxiliary mechanical output generating means may be rotated and stowed when not being used.

7. The locking wrench tool defined in claim 6, including a handle cover and grip dimensioned to fit over the end of the fixed handle structure of said tool so as to be operable to selectively hold said auxiliary mechanical output generating means stowed away.

* * * * *